US012803438B2

(12) United States Patent
Bitsch

(10) Patent No.: US 12,803,438 B2
(45) Date of Patent: Nov. 17, 2026

(54) BUCK/BOOST CONVERSION DEVICE AND CONTROL CIRCUIT FOR BIDIRECTIONAL BUCK/BOOST CONVERTER

(71) Applicant: Delta Electronics (Thailand) Public Co., Ltd., Samutprakarn (TH)

(72) Inventor: Wolfgang Bitsch, Wyhl (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 151 days.

(21) Appl. No.: 18/536,173

(22) Filed: Dec. 11, 2023

(65) Prior Publication Data

US 2024/0195304 A1 Jun. 13, 2024

(30) Foreign Application Priority Data

Dec. 12, 2022 (EP) .................................... 22212913

(51) Int. Cl.
*H02M 3/158* (2006.01)
*H02M 1/00* (2007.01)

(52) U.S. Cl.
CPC ......... *H02M 3/158* (2013.01); *H02M 1/0009* (2021.05); *H02M 3/1582* (2013.01)

(58) Field of Classification Search
CPC ... H02M 3/158; H02M 3/1582; H02M 3/1588
See application file for complete search history.

(56) References Cited

U.S. PATENT DOCUMENTS 8,593,115 B2 11/2013 Walter et al.
8,957,655 B2 2/2015 Galinski, III
2009/0108677 A1* 4/2009 Walter ................ H02M 3/1582 307/80
2009/0167269 A1* 7/2009 Zhao .................. H02M 3/1582 323/282
2010/0237840 A1 9/2010 Walter et al.
2011/0187336 A1 8/2011 Wu et al.
(Continued)

OTHER PUBLICATIONS

Extended European search report of EP22212913.2 issued on May 16, 2023.

(Continued)

*Primary Examiner* — Gustavo A Rosario-Benitez
(74) *Attorney, Agent, or Firm* — CKC & Partners Co., LLC

(57) ABSTRACT

A control circuit for a bidirectional buck/boost converter, comprising: a buck/boost detection unit configured to detect and output a mode of operation of the bidirectional buck/boost converter selected from buck mode and boost mode; a voltage/current regulator unit configured to receive the mode of operation output from the buck/boost detection unit and output a corresponding regulating signal based on the mode of operation; a PWM control unit configured to receive the regulating signal from the voltage/current regulator unit and output a PWM control signal based on the regulating signal; and a gate drive signal toggle unit configured to receive the PWM control signal and the mode of operation, generate and output gate drive signals for driving switching operations of a plurality of switches of the buck/boost converter based on the above. A buck/boost conversion device comprising the bidirectional buck/boost converter and the control circuit is also provided.

18 Claims, 4 Drawing Sheets

(56) References Cited

U.S. PATENT DOCUMENTS

| | | | | |
|---|---|---|---|---|
| 2012/0049820 | A1* | 3/2012 | Moussaoui | H02M 1/36 323/282 |
| 2012/0153915 | A1* | 6/2012 | Loikkanen | G05F 1/618 323/283 |
| 2012/0229111 | A1 | 9/2012 | Serdarevic | |
| 2016/0344290 | A1* | 11/2016 | Yang | H02M 3/1588 |
| 2019/0356227 | A1* | 11/2019 | Davison | H02M 3/158 |
| 2019/0379270 | A1* | 12/2019 | Pullen | H02M 3/1588 |
| 2020/0266710 | A1* | 8/2020 | Lin | H02M 3/1582 |
| 2020/0395851 | A1 | 12/2020 | Chao | |
| 2021/0126537 | A1* | 4/2021 | Lalithambika | H02M 3/158 |

OTHER PUBLICATIONS

The Office Action of corresponding European application No. 22212913.2, dated Jul. 8, 2026.

* cited by examiner

BUCK/BOOST CONVERSION DEVICE AND CONTROL CIRCUIT FOR BIDIRECTIONAL BUCK/BOOST CONVERTER

CROSS-REFERENCE TO RELATED APPLICATIONS

This application claims priority to European Patent Application No. 22212913.2, filed on Dec. 12, 2022. The aforementioned patent application is hereby incorporated by reference in its entirety.

TECHNICAL FIELD

The present disclosure concerns a buck/boost conversion device and a control circuit for a bidirectional buck/boost converter.

BACKGROUND

Bidirectional buck/boost converters and their control circuits are commonly known, from for example U.S. Pat. No. 8,593,115 B2.

In common control circuits for buck/boost converters, especially for battery chargers, expensive and complicated PWM (pulse width modulation) controllers are often employed, which commonly comprise a high number of inputs and outputs for controlling switches of the buck/boost converter, especially in full-bridge applications, in which the circuit is more complex and less cost-effective.

SUMMARY

It is an object of the present disclosure to provide a simple and cost-effective control circuit for a bidirectional buck/boost converter as well as a buck/boost conversion device with these advantages.

The solution of this object is achieved by the features of the independent claim. The dependent claims concern advantageous embodiments of the present disclosure.

In particular, the solution of this disclosure is achieved by a control circuit for a bidirectional buck/boost converter. The control circuit comprises a buck/boost detection unit configured to detect and output a mode of operation of the bidirectional buck/boost converter selected from buck mode and boost mode. Further, the control circuit comprises a voltage/current regulator unit configured to receive the mode of operation output from the buck/boost detection unit and configured to output a corresponding regulating signal based on the mode of operation. Furthermore, the control circuit comprises a PWM (Pulse Width Modulation) control unit configured to receive the regulating signal from the voltage/current regulator unit and configured to output a PWM control signal based on the regulating signal. The control circuit comprises a gate drive signal toggle unit configured to receive the PWM control signal and the mode of operation and configured to generate and output gate drive signals for driving switching operations of a plurality of switches of the buck/boost converter based on the mode of operation and on the PWM control signal.

Preferably, in the foregoing and in the following, the term "mode of operation" refers to "buck" or "boost" mode. Further, the mode of operation may preferably be "off", in which the converter is switched off entirely, or disconnected, for instance for protection measures. Since the modes of operation, namely buck and boost, are highly similar in a bidirectional buck/boost converter, and are commonly known, the following will generalize the control thereof to "based on mode of operation".

In the foregoing and in the following, "inputs" and "outputs" are described. Preferably, such "inputs" and "outputs" refer to signal inputs and outputs. More preferably, when referring to components having for example "exactly one" or "exactly two" inputs or outputs, this refers to inputs and outputs of (control) signals. Preferably, however, the components may comprise for instance a connection to ground and/or a reference voltage and/or a supply voltage and/or a clock signal. For instance, if a component is explained as comprising "exactly one input", this means that said component comprises exactly one signal input, but may further comprise a connection (or input) for a supply voltage and a connection to ground. In other words, "inputs" and "outputs" as set forth herein refer to a signal logic of the control circuit and/or the buck/boost converter.

Preferably, in the foregoing and in the following, when referring to control signals, "high" and "ON" on the one hand and "low" and "OFF" on the other may be used interchangeably/synonymously.

Preferably, in the foregoing and in the following, regulating signals for the buck or boost mode are discussed. The general selection of driving the buck/boost converter either in buck mode or boost mode is determined based on a command signal. This command signal is preferably an external signal, which is input to the control circuit according to the present embodiments and examples, for example by a system controller.

In addition or alternatively thereto, preferably, the command signal is determined based on detection of characteristic values within the control circuit and/or within the buck/boost converter, i.e. determined/generated internally within the control circuit.

Preferably, the buck/boost detection unit is configured to receive the command signal. Based on the command signal, the buck/boost detection unit outputs a signal indicating buck or boost mode, also referred to as "buck active signal" and "boost active signal". For example, the buck/boost detection unit preferably outputs a high signal as buck active signal and a low signal as boost active signal, or vice versa.

Preferably, the buck/boost detection unit is configured to generate the command signal, i.e. determine whether to operate the buck/boost converter in buck mode or boost mode. Preferably, the buck/boost detection unit is configured to receive voltage values from sensing units at an input side and at an output side, respectively, of the buck/boost converter. For example, such sensing units are in the following referred to as "first voltage sensing unit" and "second voltage sensing unit". Further, the buck/boost detection unit is preferably configured to compare these input and output side voltage values and determine whether to operate in buck mode or boost mode based thereon, i.e. determine the command signal based thereon. The buck/boost detection unit then outputs a high signal as buck active signal and a low signal as boost active signal, or vice versa.

Preferably, due to the control circuit comprising the gate drive signal toggle unit which generates and outputs the gate drive signals for driving switching operations, these functions are not necessarily carried out by the PWM control unit. In other words, preferably, the PWM control unit does not generate and directly output gate drive signals to the switches of the buck/boost converter. Preferably, the PWM control unit does not directly output any signals to the switches of the buck/boost converter. Thereby, the PWM control unit is simplified and the control circuit can thus be realized in a cost-effective manner.

In an embodiment, the PWM control unit is a single-ended PWM controller which provides only one output signal. In other words, preferably, the PWM control unit comprises only a single signal output for outputting a signal driving or controlling switches and/or operations of the buck/boost converter.

In another embodiment, the PWM control unit comprises one or more further outputs, especially output pins, which are, however, not (directly) used to drive switches and/or control the buck/boost converter. For instance, the PWM control unit may comprise one or more reference outputs outputting a reference voltage, for instance a 5 V reference voltage.

Preferably, the buck/boost detection unit and/or the voltage/current regulator unit and/or the PWM control unit and/or the gate drive signal toggle unit are separate components, especially separate integrated circuits (henceforth "ICs" or "IC"). Preferably, the PWM control unit and the gate drive signal toggle unit are separate components and are especially not components of a single IC.

Preferably, the gate drive signal toggle unit has two inputs, namely the PWM control signal output by the PWM control unit and the mode of operation output from the buck/boost detection unit. Preferably, the gate drive signal toggle unit has exactly two inputs, especially exactly and only the foregoing described inputs.

Preferably, the gate drive signal toggle unit has two outputs. Preferably the gate drive signal toggle unit has exactly two outputs.

In one advantageous embodiment, the gate drive signal toggle unit is configured to output one drive signal for a first switch and one drive signal for a second switch. Therein, based on the mode of operation, the gate drive signal toggle unit is configured to generate a first drive signal by inverting the PWM control signal an odd number of times. For example, the PWM control signal is inverted once or three times or five times, etc. Therein, the inverted drive signal is especially a synchronous rectification signal.

Preferably, the number of inversions for the odd PWM control signal is one. In other words, the gate drive signal toggle unit is configured to output the first drive signal as an inverted PWM control signal, in which the PWM control signal received from the PWM control unit is inverted.

Preferably, the inverted PWM control signal is output to at least one switch, preferably exactly one switch, of the buck/boost converter.

Preferably, in the foregoing and in the following, the term "one switch" also encompasses an exemplary possibility in which one or each of the aforementioned switches (first switch and/or second switch) is respectively replaced by a plurality of switches connected in parallel as a switch unit, for example for current distribution. Therein, each of such switch units is preferably driven in common by a same PWM control signal. In other words, preferably, the once-inverted PWM control signal is output to one switch unit, and the twice-inverted PWM control signal is output to another switch unit of the buck/boost converter.

Preferably, the gate drive signal toggle unit is further configured to generate a second drive signal by inverting the PWM control signal an even number times. In other words, preferably, the second gate drive signal corresponds to an even number of inversions of the PWM control signal.

Preferably, the even number of inversions for the PWM control signal may also be zero, zero being an even number. In such a case, the "even inverted PWM control signal" corresponds to the PWM control signal output by the PWM control unit. Further preferably therein, the "odd inverted PWM control signal" corresponds to a single inversion. Thus, in such a preferable case, the PWM control signal is input into one switch (or switch unit), and the once-inverted PWM control signal is input into another switch (or switch unit) as a synchronous rectification signal.

Preferably, the first drive signal and the second drive signal are therefore inverted with respect to one another. Thereby, the second drive signal is used as a drive signal for the second switch of the buck/boost converter essentially controlling the bucked or boosted voltage, whereas the first drive signal (the inverted signal) is used for synchronous rectification of the first switch. Essentially, the first switch thereby replaces a diode operation in the buck/boost converter. Thereby, preferably, the second switch is "ON" when the first switch is "OFF" and vice versa.

Preferably, the gate drive signal toggle unit comprises at least one inverter. In the exemplary case of the even inversion being an inversion of zero, the signal is not input/output into/from an inverter. In this case, the gate drive signal toggle unit preferably comprises only one inverter for inverting the odd inverted PWM control signal once. Further preferably, the gate drive signal toggle unit comprises two inverters. Therein, preferably, the even PWM control signal is inverted twice by being input/output to both inverters, or is inverted zero times by not being input/output to any one of the two inverters, and the odd PWM control signal is inverted once by being input/output to only one inverter.

Preferably, the at least one inverter is a Schmitt trigger, more preferably an inverting Schmitt trigger. Preferably, the PWM control signal is input to a first inverter of the gate drive signal toggle unit, especially as an input of the gate drive signal toggle unit. The first inverter preferably outputs the inverted PWM control signal to another inverter and, preferably in parallel, towards an output and/or further components of the gate drive signal toggle unit. The second inverter preferably receives the inverted PWM control signal and outputs towards an output and/or further components of the gate drive signal toggle unit.

Preferably, the gate drive signal toggle unit comprises an on-time-duration limitation unit. The on-time duration limitation unit is configured to limit a time-duration of at least one of the gate drive signals to a maximum threshold value. Therein, the on-time-duration limitation unit is configured to set said gate drive signal(s) to low when the on-time-duration of the gate drive signal reaches the maximum threshold value. Thereby, preferably, a scenario is avoided in which the PWM control unit is turned off, thereby constantly outputting low, and the gate drive signal toggle unit thus constantly outputting high (via the odd inversion), which can otherwise damage the control circuit and/or the buck/boost converter and/or switches thereof.

Preferably, the maximum threshold value is a time value. Preferably, the maximum threshold value is roughly equal to (or rather an inversion of) a switching frequency of the buck/boost converter. For example, the maximum threshold value is set to roughly 10 us at an exemplary switching frequency of 100 KHz.

In one advantageous embodiment, the gate drive signal toggle unit comprises a dead-time generation unit configured to generate a dead-time between the gate drive signals. Thereby, a possible short-circuit is prevented by preventing "ON" overlap between the gate drive signals for the first and the second switches. Preferably, the dead-time is for example roughly 200 ns.

Preferably, at least one of the switches and/or at least one of the switch units comprises a MOSFET (Metal-Oxide-Semiconductor Field-Effect Transistor). Preferably, the at least one MOSFET is an SiC—, GaN—, or Si-MOSFET. In addition or alternatively thereto, one or more switches is preferably an IGBT (Insulate-Gate Bipolar Transistor), or the like.

In a preferable embodiment, the PWM control signal is input to the first inverter. The first inverter inverts the PWM control signal and outputs the once-inverted PWM control signal to the second inverter and additionally to the on-time-duration limitation unit. The on-time-duration limitation unit preferably outputs the (duration limited) once-inverted PWM control signal to a buck/boost mode selection logic. The second inverter preferably outputs the (even inverted) PWM control signal also to the buck/boost mode selection logic unit. The buck/boost mode selection logic unit is preferably connected to or comprises the input for the mode of operation signal output by the buck/boost detection unit. The buck/boost mode selection logic unit selects, based on the mode of operation, which PWM control signal (odd inverted or even inverted) is to be output to which output of the gate drive signal toggle unit. In other words, the buck/boost mode selection logic unit selects which switch of the buck/boost converter is to receive which PWM control signal. Preferably, the buck/boost mode selection logic unit outputs the two PWM control signals to the dead-time generation unit, which generates the dead-time between the two PWM control signals before outputting these to the respective switches.

Preferably, during buck mode for instance, the PWM control signal inverted an odd number of times and duration limited (i.e. the synchronous rectification signal) is the signal output to the second switch of the buck/boost converter. Preferably, the PWM control signal inverted an even number of times is output to the first switch of the buck/boost converter. During boost mode, the opposite is preferably the case.

Preferably, the control circuit comprises a high-side/low-side driver unit configured to receive the gate drive signals output from the gate drive signal toggle unit and configured to amplify the gate drive signals and output the amplified gate drive signals to the switches. Preferably, the gate drive signal toggle unit outputs a relatively low voltage signal, for example 5 V at roughly 10 mA. The PWM control signal output by the PWM control unit is preferably roughly 12 V to 15 V. Therefore, preferably, the gate drive signals output by the gate drive signal toggle unit are amplified, preferably to a current of roughly one to multiple amp (A), so as to quickly drive the switches.

Preferably, the high-side/low-side driver unit comprises two inputs for the even and odd inverted PWM control signals output by the gate drive signal toggle unit and further comprises two outputs for the amplified PWM control signals. Preferably, the high-side/low-side driver unit comprises exactly these two inputs and exactly these two outputs.

Preferably, the high-side/low-side driver unit receives the two inputs directly from the gate drive signal toggle unit (preferably the dead-time generation unit) and preferably outputs the amplified PWM control signals directly to the switches.

Preferably, the synchronous rectified switch is deactivated at low output current so as to prevent back-sourcing to the input voltage.

Preferably, the high-side/low-side driver unit comprises at least one charge-pump for generating the supply voltage of the high-side/low-side driver unit.

Further preferably, the at least one charge-pump for supplying the first switch is implemented in the high-side/low-side driver unit so as to start and source the high-side/low-side driver unit with a connected output of the converter, for example, a connected battery and in particular if the second switch is deactivated e.g. at low currents to prevent back-sourcing. In such cases, when said second switch is deactivated, mere common bootstrap supplies may not work at pre-biased outputs (i.e. in the exemplary case of a battery connected to output). The at least one charge pump thus provides a source voltage for the high-side/low-side driver unit above ground voltage.

In one advantageous embodiment, the control circuit comprises a plurality of current sensing units, in which each of the plurality of current sensing units senses current of one of the plurality of switches. Preferably, each current sensing unit is connected in series with one switch. The control circuit preferably comprises a current sense toggle unit configured to receive a current value output by each of the current sensing units, configured to receive the mode of operation, and configured to output the current value sensed by one of the current sensing units based on the mode of operation to the PWM control unit. In other words, preferably, the current sense toggle unit toggles, based on the mode of operation, the current values sensed by which one of the current sensing units is to be output to the PWM control unit, i.e. toggles the current value of which switch to be output to the PWM control unit. The PWM control unit uses the input current value for generating and regulating the PWM control signal.

In one advantageous embodiment, the control circuit comprises a buck/boost DC sensing unit configured to sense a current output by the buck/boost converter and is configured to feed the sensed current back to the voltage/current regulator unit.

Preferably, the buck/boost DC sensing unit comprises a resistor, especially a shunt resistor, for measuring the current. The direction of current flowing through the resistor of the buck/boost DC sensing unit during buck operation is opposite the direction of current flowing through said resistor during boost operation.

In the preferable case of the resistor being a shunt resistor, this provides a limitation of the maximum battery current and further an output power limitation in boost mode. Further, the shunt resistor provides advantageously more precise charging current regulation in buck mode.

Preferably, multiple buck/boost converters and control circuits are connected in common on an input side, for example in common to an input bus, and are each connected to a battery or battery pack. In such an exemplary case, the shunt resistor preferably provides current balancing between such multiple buck/boost converters between the multiple batteries or battery packs, especially in boost mode (i.e. especially when discharging the multiple batteries or battery packs).

Preferably, the buck/boost DC sensing unit comprises two outputs. A first output is preferably configured to output a current value during buck mode (henceforth "buck out signal" or "buck out current signal"). A second output is preferably configured to output a current value during boost mode (henceforth "boost out signal" or "boost out current signal"). Therein, the buck/boost DC sensing unit is preferably configured such that the first output only outputs a current value during buck mode, and such that the second output only outputs a current value during boost mode.

Preferably, the voltage/current regulator unit is configured to regulate the voltage and/or current regulating signal based on the fed back sensed current. Preferably, the voltage/current regulator unit is configured to regulate the voltage and/or current regulating signal based on the aforementioned buck out or boost out signals.

Advantageously, the voltage/current regulator unit comprises a buck regulator subunit and a boost regulator subunit. Each buck/boost subunit preferably comprises an input for receiving the respective buck out or boost out signal from the respective output of the buck/boost DC sensing unit. Preferably, the buck regulator subunit is de-activated by a non-zero boost out signal, and the boost regulator subunit is de-activated by a non-zero buck out signal.

Further preferably, the buck regulator subunit and the boost regulator subunit are connected in parallel, such that the voltage/current regulator unit outputs a regulating signal irrespective of the mode of operation.

Advantageously, the control circuit further comprises a first voltage sensing unit, which is configured to sense a voltage at the input side of the converter. Further advantageously, the control circuit further comprises a second voltage sensing unit, which is configured to sense a voltage at the output side of the converter. Preferably, the first and second voltage sensing units do not correspond to the buck/boost detection unit or to the buck/boost DC sensing unit.

Preferably, the buck regulator subunit is configured to receive a voltage value sensed by the second voltage sensing unit of the output side of the converter. Further preferably, the boost regulator subunit is configured to receive a voltage value sensed by the first voltage sensing unit of the input side of the converter.

Further advantageously, each of the buck regulator subunit and the boost regulator subunit are configured to output a regulated current and a regulated voltage.

Further preferably, each subunit is configured to output the regulated current based on a comparison of an external reference signal with the respective buck out or boost out current signal. Preferably, the external reference signal is input to the control circuit from, for instance, the system controller. For instance, the reference signal indicates a target current value for the buck/boost converter. For instance, the reference signal is preferably a fixed internal value.

Further preferably, each subunit is configured to output the regulated voltage based on a comparison of the external reference signal (indicating, for instance, a target voltage value) with the voltage value sensed by the first voltage sensing unit or the second voltage sensing unit.

Preferably, the boost regulator subunit is configured to receive the buck active signal, and the buck regulator subunit is configured to receive the boost active signal. In both cases, the respective subunit is configured to be de-activated when the (opposite) respective active signal is non-zero.

Further preferably, the voltage regulation of the boost regulator subunit has a falling characteristic at rising load, i.e. the higher the output current, the lower the regulated booster output voltage. Due to the falling output voltage characteristic, an output current balance is preferably achieved if two or more modules are used in parallel.

In summary, the voltage/current regulator unit preferably comprises an input for buck out current signal and an input for reference current (buck regulator subunit current regulation), an input for voltage value at the output side (from second voltage sensing unit) and an input for reference voltage (buck regulator subunit voltage regulation), an input for boost out current signal and an input for reference current (boost regulator subunit current regulation), an input for voltage value at the input side (from first voltage sensing unit) and an input for reference voltage (boost regulator subunit voltage regulation). Further, the voltage/current regulator unit preferably comprises an input for boost active signal for de-activating buck regulator subunit voltage regulation and an input for buck active signal for de-activating boost regulator subunit voltage regulation.

Preferably, the PWM control unit comprises a comparator configured to compare the regulated signal from the voltage/current regulator unit with the signal from the current sense toggle unit, i.e. with the signal from one of the current sensing units. The PWM control unit preferably outputs the PWM control signal based on the output of the comparator. Thereby, preferably, the PWM control unit is configured to perform peak current mode modulation based on said regulated signal.

Preferably, the PWM control unit comprises a first pin, commonly referred to as "output/compensation" pin. Commonly, the compensation pin is connected to an internal error amp (op amp) used for instance as a voltage regulator. Preferably, in the present control circuit, the internal error amp is used solely as a voltage follower, since the external voltage/current regulator unit of the control circuit regulates for buck and boost mode.

Preferably, the PWM control unit comprises a second pin, commonly referred to as "voltage feedback input", which is connected to a negative input of the error amp. Preferably, the signal output from the voltage/current regulator unit is input to this pin.

Preferably, the PWM control unit comprises a third pin, commonly referred to as "current sense" pin. Preferably, the signal output from the current sense toggle unit (the sensed current of the respective switch) is input to this pin as a positive input of the PWM control unit comparator.

Preferably, the signal output from the current sense toggle unit input to the third pin additionally comprises a slope compensation signal.

Preferably, the PWM control unit comprises a fourth pin, commonly referred to as "$R_T/C_T$" pin, which is connected to a grounded capacity ("$C_T$") and a resistor ("$R_T$") for defining the switching frequency and the maximum on duration of the PWM control signal. In one embodiment of the present disclosure, the switching frequency is roughly 100 kHz and the maximum on duration is roughly 97%.

Preferably, the PWM control unit comprises a fifth pin, commonly referred to as ground pin, with which the PWM control unit is grounded.

Preferably, the PWM control unit comprises a sixth pin, commonly referred to as output pin, via which the PWM control unit outputs the PWM control signal.

Preferably, the PWM control unit comprises a seventh pin, commonly referred to as "$V_{CC}$" pin or "power supply pin", via which the PWM control unit receives supply voltage.

Preferably, the PWM control unit comprises an eighth pin, commonly referred to as "$V_{REF}$" pin, which is the reference voltage output by the PWM control unit, which is preferably 5 V.

Preferably, the PWM control unit comprises only the aforementioned eight pins.

In one advantageous embodiment, the buck/boost converter comprises a bus connection, for example for connection with mains and/or an external power supply, as an input. Further preferably, the buck/boost converter comprises an output side connection, for example for connection with a battery pack.

For ease of explanation, in the following, "input" will be referred to as the input side during buck mode. It however goes without saying that during boost mode, "input" may be the "output" of the buck mode, and vice versa. In such an exemplary case, when the mains is a 24 V connection, and the battery pack has a nominal voltage of 14 V, when charging the battery pack, the converter is operated as buck, and when discharging the battery pack, the converter is operated as boost.

Further preferably, the buck/boost converter comprises a first switch connected in series between the input and output side. Further preferably, the buck/boost converter comprises an inductance in series with the first switch. Further preferably, the buck/boost converter comprises a second switch connected between the first switch and the inductance. Further preferably, the buck/boost converter comprises capacities each connected in parallel with the input and output side. Preferably, the resistor of the buck/boost DC sensing unit is connected in series between the output side and the input side. Preferably, the buck/boost converter comprises a bidirectional blocking circuit connected in series between the input side and the output side. Thereby, preferably, for instance in case of malfunction, the input side and the output side can be disconnected from one another.

The present disclosure also concerns a buck/boost conversion device. The buck/boost conversion device comprises a bidirectional buck/boost converter and the control circuit according to any one of the foregoing described preferable configurations. Therein, the control circuit is configured to control the buck/boost converter so as to buck a voltage input into the buck/boost conversion device or so as to boost a voltage output by the buck/boost conversion device.

Preferably, the buck/boost converter comprises a first switch and a second switch. Therein, for example in buck mode, the second switch is driven with the synchronous rectification signal so as to function as a diode of the buck/boost converter, and the first switch is driven with the even inverted PWM control signal so as to function, together with at least one inductance of the buck/boost converter, as a voltage buck, or vice-versa in boost mode based on the mode of operation. For instance, in the boost mode, the second switch is preferably driven with the even inverted PWM control signal while the first switch is driven with the odd inverted synchronous rectification signal.

Further preferably, the buck/boost conversion device is connected to a battery pack comprising at least one battery.

Advantageously, the buck/boost conversion device further comprises a bidirectional blocking circuit, especially in series with the battery pack. Preferably, the bidirectional blocking circuit is a back-to-back ORing. For example, the back-to-back ORing comprises two switches connected in anti-series with one another. The bidirectional blocking circuit further provides the advantage that input and output side of the buck/boost converter can be disconnected from one another, especially for instance in case of a malfunction, or for example in case of an output overvoltage event.

Preferably, the buck/boost conversion device comprises a plurality of bidirectional buck/boost converters and a plurality of control circuits according to any one of the foregoing described preferable configurations. Preferably therein, each of the buck/boost converters comprises a respective output respectively connected to one or more batteries. Further preferably, the plurality of buck/boost converters are connected in common, especially in parallel, to an input side, particularly an input bus. For example, the plurality of buck/boost converters are connected in common to a 24 V bus connection and are each connected to a battery or battery pack with, for example, a nominal voltage of 14 V. Advantageously, in the preferable case that one or more, preferably all, such connected buck/boost converters and their respective control circuits comprise the shunt resistance, current balancing may be achieved between the batteries/battery packs.

BRIEF DESCRIPTION OF DRAWINGS

Further details, advantages, and features of the preferred embodiments of the present disclosure are described in detail with reference to the figures. Therein.

DESCRIPTION OF EMBODIMENTS

Figure 1:
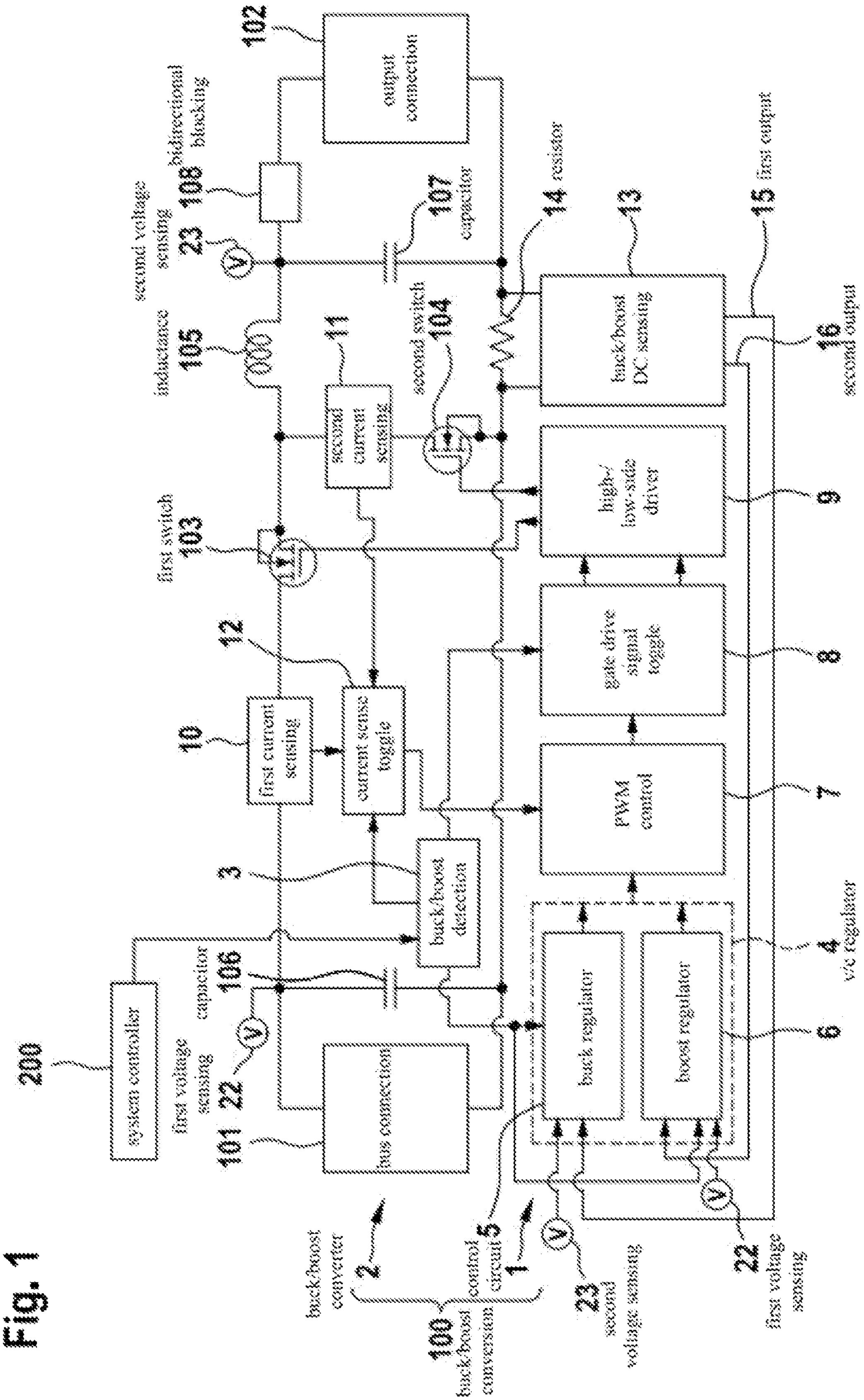
FIG. 1 shows a schematic logic circuit diagram of a control circuit and a bidirectional buck/boost converter according to a first embodiment of the present disclosure.

FIG. 1 shows a schematic logic circuit diagram of a control circuit 1 and a bidirectional buck/boost converter 2 according to a first embodiment of the present disclosure. In particular, FIG. 1 shows a buck/boost conversion device 100 comprising the control circuit 1 and the bidirectional buck/boost converter 2.

The bidirectional buck/boost converter 2 (henceforth "the converter 2") will be firstly described. The converter 2 according to the present embodiment comprises a bus connection 101, for example for connection with mains and/or an external power supply, as an input. Further, the converter 2 comprises an output side connection 102, for example for connection with a battery pack. In the present embodiment, the bus connection 101 is connected with mains and the output side connection 102 is connected to a battery pack. Preferably, the mains is a 24 V source. A nominal voltage of the battery pack is for example 14 V. Therefore, the converter 2 boosts or bucks the voltages between the input side 101 and the output side 102 depending on whether the battery pack is being charged (buck mode) or is being discharged (boost mode).

For ease of explanation, in the following, "input" will be referred to as the input side bus connection 101 during buck mode. It however goes without saying that during boost mode, "input" may be the "output" at the output side 102 of the buck mode, since for example the battery pack inputs energy into the converter 2 during discharge, and vice versa.

Further, the converter 2 comprises a first switch 103 connected in series between the bus connection 101 and the output side connection 102. The converter 2 comprises an inductance 105 in series with the first switch 103.

The converter 2 comprises a second switch 104 connected between the first switch 103 and the inductance 105. Further, the converter 2 comprises capacities 106, 107 respectively connected in parallel with the bus connection 101 and the output side connection 102.

The first switch 103 and the second switch 104 are respectively MOSFETs.

The converter 2 comprises a bidirectional blocking circuit 108 connected in series between the bus connection 101 and the output side connection 102. Thereby, preferably, for instance in case of malfunction, the input side and the output side of the converter 2 can be securely disconnected from one another.

Further in view of FIG. 1, the control circuit 1 will be described. First, an overview of the components of the control circuit 1 will be discussed, before a signal flow thereof is explained.

The control circuit 1 comprises a buck/boost detection unit 3 configured to detect and output a mode of operation of the bidirectional buck/boost converter selected from buck mode and boost mode. In the present embodiment, the buck/boost detection unit 3 is configured to receive a command signal from an external system controller 200. The command signal indicates whether the converter 2 is to be driven in buck mode or boost mode. For instance, the command signal is based on charge status of the battery pack, or whether for example a mains failure has taken place. An exemplary embodiment in which the buck/boost detection unit 3 is configured to output the mode of operation based on detection, i.e. not based (entirely or solely) on an external command signal, will be discussed with respect to FIG. 3 below.

Further, the control circuit 1 comprises a voltage/current regulator unit 4 configured to receive the mode of operation output from the buck/boost detection unit 3 and configured to output a corresponding regulating signal based on the mode of operation.

The voltage/current regulator unit 4 comprises a buck regulator subunit 5 and a boost regulator subunit 6, which will be described in detail below.

Furthermore, the control circuit 1 comprises a PWM (Pulse Width Modulation) control unit 7 configured to receive the regulating signal from the voltage/current regulator unit 4 and configured to output a PWM control signal based on the regulating signal.

The control circuit 1 comprises a gate drive signal toggle unit 8 configured to receive the PWM control signal and the mode of operation and configured to generate and output gate drive signals for driving switching operations of the switches 103, 104 of the converter 2 based on the mode of operation and on the PWM control signal.

As can be taken from FIG. 1, the PWM control unit 7 is a single-ended PWM controller which provides only one output signal. In other words, the PWM control unit 7 comprises only a single signal output for outputting a signal driving or controlling the switches 103, 104. Thereby, a low cost and efficient PWM controller can be used for the control circuit 1 of the present embodiment.

Further, the control circuit 1 comprises a high-side/low-side driver unit 9 configured to receive the gate drive signals output from the gate drive signal toggle unit 8 and configured to amplify the gate drive signals and output the amplified gate drive signals to the switches 103, 104.

In the present embodiment, the gate drive signal toggle unit 8 outputs a relatively low voltage signal, for example 5 V at roughly 10 mA. The PWM control signal output by the PWM control unit 7 is for example roughly 12 V to 15 V. Therefore, the gate drive signals output by the gate drive signal toggle unit 8 are amplified by the high-side/low-side driver unit 9, preferably to a current of roughly one to multiple amp (A), so as to quickly drive the switches 103, 104, especially so as to overcome a gate resistance of the switches 103, 104.

The control circuit 1 further comprises current sensing units 10, 11. A first current sensing unit 10 is connected in series with the first switch 103. The first current sensing unit 10 especially senses a (non-zero) current during buck mode operation.

A second current sensing unit 11 is connected in series with the second switch 104. The second current sensing unit 11 especially senses a (non-zero) current during boost mode operation.

Further, the first and second current sensing units 10, 11 are each connected to a current sense toggle unit 12. The current sense toggle unit 12 is configured to receive a current value output by each of the current sensing units 10, 11.

Further, as can be taken from FIG. 1, the current sense toggle unit 12 is configured to receive the mode of operation from the buck/boost detection unit 3. The current sense toggle unit 12 is configured to output the current value sensed by one of the current sensing units 10, 11 based on the mode of operation to the PWM control unit 7. In other words, the current sense toggle unit 12 toggles, based on boost mode or buck mode, the current values sensed by which one of the current sensing units 10, 11 is to be output to the PWM control unit 7, i.e. toggles the current value of which switch 103, 104 to be output to the PWM control unit 7.

The PWM control unit 7 uses the input current value from the current sense toggle unit 12 for generating and regulating the PWM control signal, which is then output to the gate drive signal toggle unit 8.

In particular, the PWM control unit 7 is configured to compare the regulated signal from the voltage/current regulator unit 4 with the current signal from the current sense toggle unit 12, i.e. with the signal from one of the current sensing units 10, 11. The PWM control unit 7 outputs the PWM control signal based on this comparison. Thereby, preferably, the PWM control unit 7 is configured to perform peak current mode modulation based on said regulated signal and based on the input current signal from the current sense toggle unit 12 from the current sensing units 10, 11.

The control circuit 1 comprises a buck/boost DC sensing unit 13.

The buck/boost DC sensing unit 13 is configured to sense a current output by and/or flowing through the converter 2 and is configured to feed the sensed current back to the voltage/current regulator unit 4. The buck/boost DC sensing unit 13 comprises a resistor 14, especially a shunt resistor, for measuring the current. As can be taken from FIG. 1, the buck/boost DC sensing unit 13 measures a current flowing between the bus connection 101 and the output side connection 102. The direction of current flowing through the resistor 14 of the buck/boost DC sensing unit 13 during buck operation is opposite the direction of current flowing through said resistor 14 during boost operation. The buck/boost DC sensing unit 13 is configured to measure the current irrespective of its direction, for instance via a bidirectional current sensing configuration. Thereby, in both buck mode and boost mode, the buck/boost DC sensing unit 13 can measure the current being output by or input into the converter 2.

Preferably, the buck/boost DC sensing unit 13 comprises two outputs 15, 16. A first output 15 is preferably configured to output a current value during buck mode (henceforth "buck out signal"). A second output 16 is preferably configured to output a current value during boost mode (henceforth "boost out signal").

Therein, the buck/boost DC sensing unit 13 is preferably configured such that the first output 15 only outputs a current value during buck mode, and such that the second output 16 only outputs a current value during boost mode.

The voltage/current regulator unit 4 is configured to regulate the voltage and/or current regulating signal based on the fed back sensed current. More specifically, the voltage/current regulator unit 4 is configured to regulate the voltage and/or current regulating signal based on the aforementioned buck out or boost out signals. The voltage/current regulator unit 4 is also configured to regulate the voltage and/or current regulating signal based on sensed voltage values at the input side (bus connection 101) and at the output side 102 (battery pack).

For this, the control circuit 1 further comprises a first voltage sensing unit 22, which is configured to sense a voltage at the bus connection 101. Further, the control circuit 1 comprises a second voltage sensing unit 23, which is configured to sense a voltage at the output side connection 102 (herein, the battery pack).

The voltage/current regulator unit 4 comprises a buck regulator subunit 5 and a boost regulator subunit 6, as mentioned above. Each buck/boost subunit 5, 6 preferably comprises an input for receiving the respective buck out or boost out signal from the respective output 15, 16 of the buck/boost DC sensing unit 13.

The buck regulator subunit 5 is de-activated by a non-zero boost out signal, and the boost regulator subunit 6 is de-activated by a non-zero buck out signal, which will be explained below. Further as demonstrated in FIG. 1, the buck regulator subunit 5 and the boost regulator subunit 6 are connected with their outputs in parallel, such that the voltage/current regulator unit 4 outputs a regulating signal irrespective of the mode of operation.

Each of the buck regulator subunit 5 and the boost regulator subunit 6 are configured to output a regulated current and a regulated voltage. Further, the buck/boost detection unit 3 also outputs the operation mode (being boost active or buck active signals) to the buck regulator subunit 5 and the boost regulator subunit 6.

Further, the voltage value sensed by the second voltage sensing unit 23 is input to the voltage/current regulator unit 4, more specifically to the buck subunit 5 thereof. The voltage value sensed by the first voltage sensing unit 22 is input to the voltage/current regulator unit 4, more specifically to the boost subunit 6 thereof. Therein, the voltage/current regulator unit 4 is configured to regulate the current/voltage output to the PWM control unit 7 based additionally on the sensed voltage values from the first and second voltage sensing units 22, 23.

Therein, each subunit 5, 6 is configured to output the regulated voltage based on a comparison of an external reference signal (indicating, for instance, a target voltage value) from for instance the external system controller 200 with the respective voltage value output by the respective voltage sensing unit 22, 23. The boost regulator subunit 6 is configured to receive the voltage value at the input side 101 from the first voltage sensing unit 22, and the buck regulator subunit 5 is configured to receive the voltage value at the output side 102, from the second voltage sensing unit 23. In other words, each subunit 5, 6 preferably compares the target voltage value given by the reference signal with the generated value fed back from the voltage sensing units 22, 23 during voltage regulation.

Further, each respective subunit 5, 6 is configured to be de-activated when the respective (the oppositely respective) active signal (buck active or boost active) from the buck/boost detection unit 3 is non-zero such that said respective subunit 5, 6 does not output a regulated voltage.

Further therein, each subunit 5, 6 is also configured to output the regulated current based on a comparison of the external reference signal with the respective buck out or boost out current signal from the buck/boost DC sensing unit 13. Herein, the reference signal for instance indicates a target current value for the converter 2. In other words, the buck regulator subunit 5 for instance compares the external reference signal with the buck out signal (being the current signal from the buck/boost DC sensing unit 13 during buck mode) and outputs the regulated current based thereon. The same holds correspondingly true for the boost regulator subunit 6 with the boost out signal.

In other words, voltage regulation is activated and de-activated via the buck active or boost active signals from the buck/boost detection unit 3, whereas current regulation is activated and de-activated via the buck out or boost out signals from the buck/boost DC current sensing unit 13.

Therefore, the voltage/current regulator unit 4 comprises an input for buck out current signal and an input for reference current (buck regulator subunit 5 current regulation), an input for boost active signal, an input for reference voltage, and an input for the respectively sensed voltage value (buck regulator subunit 5 voltage regulation), an input for boost out current signal and an input for reference current (boost regulator subunit 6 current regulation), an input for buck active signal, an input for reference voltage, and an input for the respectively sensed voltage value (boost regulator subunit 6 voltage regulation).

Based on these input signals, the voltage/current regulator unit 4 outputs a current/voltage regulating signal to the PWM control unit 7. As mentioned above, the PWM control unit 7 outputs the PWM control signal based on the regulating signal to the gate drive signal toggle unit 8, which will now be explained in view of FIG. 2.

Figure 2:
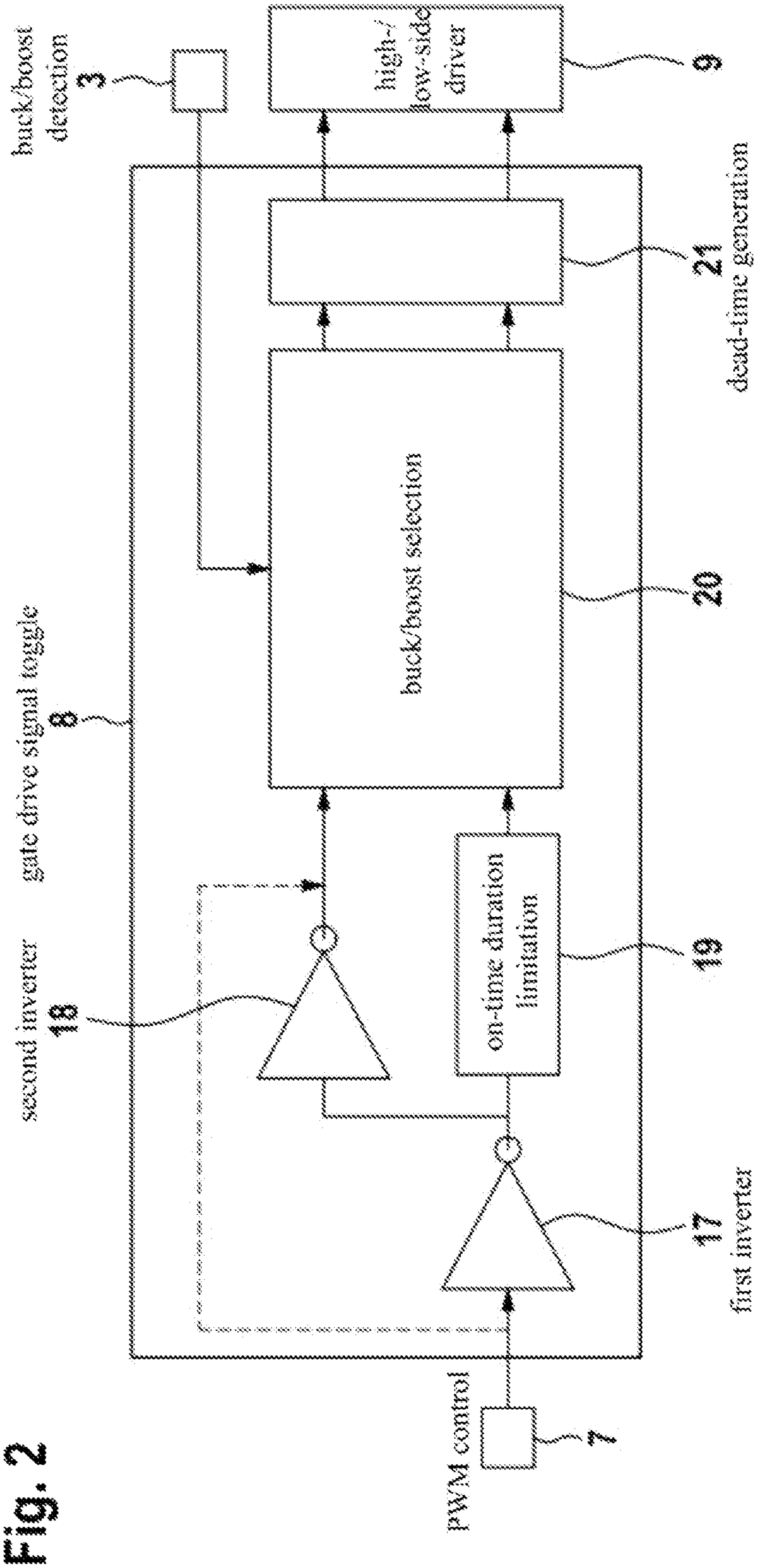
FIG. 2 shows a detailed schematic logic circuit diagram of a gate drive signal toggle unit of the control circuit according to the embodiments of the present disclosure.

FIG. 2 shows a detailed schematic logic circuit diagram of the gate drive signal toggle unit 8 of the control circuit 1.

Therein, as can be seen on the left side of FIG. 2, the PWM control signal output from the PWM control unit 7 is input into the gate drive signal toggle unit 8.

The PWM control signal is input into a first inverter 17. Preferably, the first inverter 17 is a Schmitt trigger. Thereby, the PWM control signal (in addition to threshold properties) is inverted. The inverted PWM control signal is then input into a second inverter 18, which is preferably also a Schmitt trigger. The inverted PWM control signal is thus twice-inverted via the second inverter 18.

The twice-inverted PWM control signal is essentially used to drive one of the switches 103, 104 so as to voltage boost or voltage buck, depending on the mode of operation. Essentially, the once-inverted PWM control signal is used to drive the other switch 104, 103 in accordance with synchronous rectification, essentially as a diode opposing the driving of the one switch 103, 104.

As can be taken from the dotted lines in FIG. 2, in addition to twice-inverting the PWM control signal via the first inverter 17 and the second inverter 18 for driving of the switches (not as synchronous rectification), the PWM control signal may also be non-inverted (for an even number of inversions being 0, 2, 4, 6, etc.). Thereby, the PWM control signal is herein once inverted (for an odd number of inversions being 1, 3, 5, etc.) via the first inverter 17 in parallel to the PWM control signal not being inverted (branch of second inverter 18).

In the present embodiment, the once-inverted PWM control signal (from the first inverter 17) is input, in parallel to the second inverter 18, into an on-time-duration limitation unit 19. The on-time duration limitation unit 19 is configured to limit a time-duration of one of the gate drive signals to a maximum threshold value. Therein, the on-time-duration limitation unit 19 is configured to set said gate drive signal (s) to low when the on-time-duration of the gate drive signal reaches the maximum threshold value. Thereby, a scenario is avoided in which the PWM control unit 7 is turned off, thereby constantly outputting low, and the gate drive signal toggle unit 8 thus constantly outputting high (via the inversion), which would otherwise damage the converter 2 and/or specifically the switches 103, 104 thereof.

Preferably, the maximum threshold value is a time value. Preferably, the maximum threshold value is roughly equal to (or rather an inversion of) a switching frequency of the converter 2. For example, the maximum threshold value is set to roughly 10 μs at an exemplary switching frequency of 100 KHz.

Further in view of FIG. 2, both the once-inverted PWM control signal from the first inverter 17 (from the on-time-duration limitation unit 19) and the twice-inverted PWM control signal from the second inverter 18 are input into a buck/boost mode selection logic 20.

The buck/boost mode selection logic unit 20 is connected to or comprises the input for the mode of operation signal output by the buck/boost detection unit 3 (right side of FIG. 2). The buck/boost mode selection logic unit 20 is configured to select, based on the mode of operation, which PWM control signal (once-inverted or twice-inverted) is to be output to which output of the gate drive signal toggle unit 8. In other words, the buck/boost mode selection logic unit 20 selects which switch 103, 104 of the converter 2 is to receive which PWM control signal via the high-side/low-side driver unit 9.

The buck/boost mode selection logic unit 20 outputs the two PWM control signals to a dead-time generation unit 21, which generates a dead-time between the two PWM control signals before outputting these to the respective switches 103, 104 via the high-side/low-side driver unit 9. The generated dead-time is preferably roughly 200 ns.

Thus, the high-side/low-side driver unit 9 outputs the once-inverted PWM control signal and the twice-inverted PWM control signal, along with maximum on-duration being limited and dead-time being generated therebetween, to the switches 103, 104, to thereby drive the converter 2.

Figure 3:
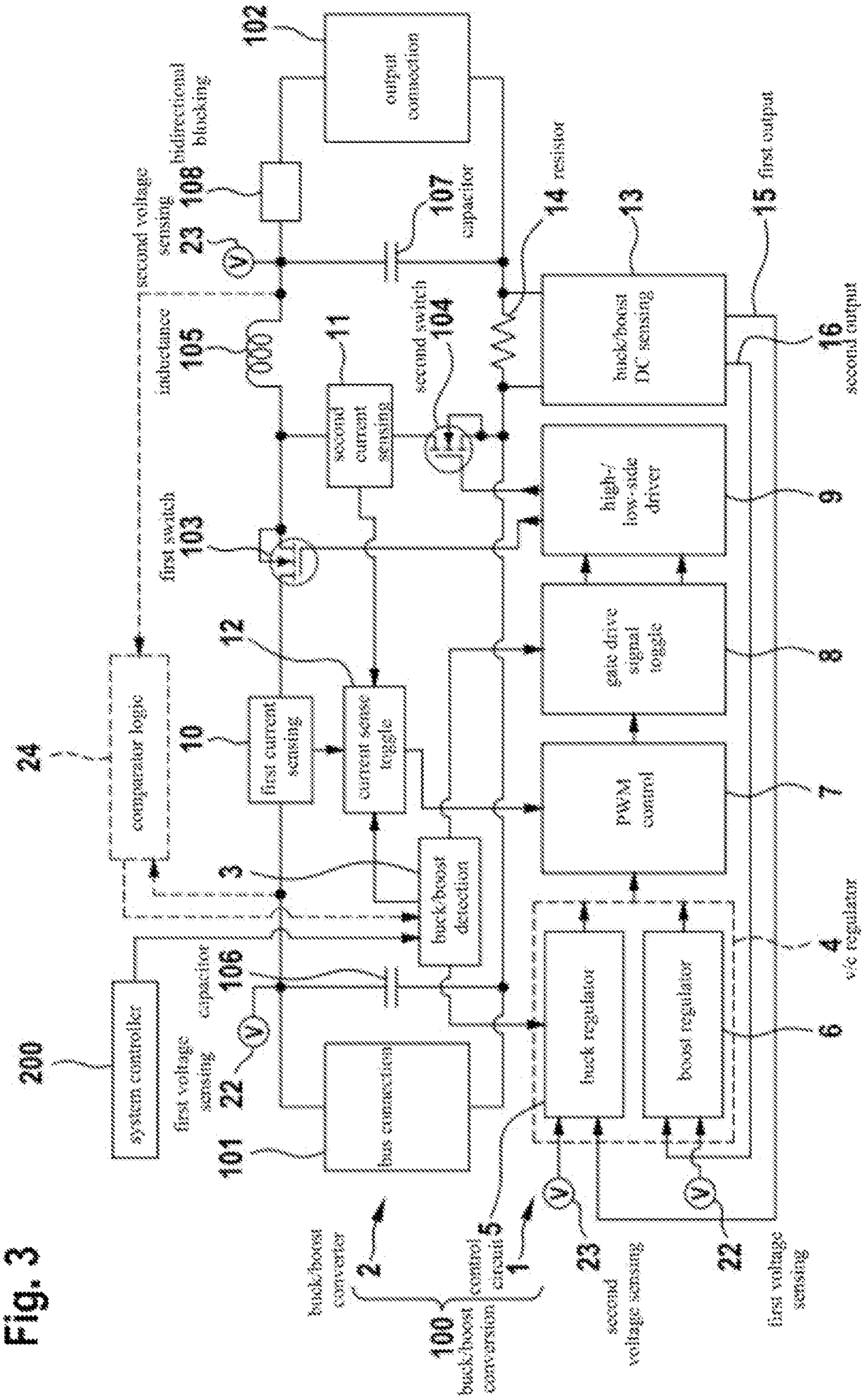
FIG. 3 shows a schematic logic circuit diagram of a control circuit and a bidirectional buck/boost converter according to a second embodiment of the present disclosure.

FIG. 3 shows a schematic logic circuit diagram of a control circuit 1 and a bidirectional buck/boost converter 2 according to a second embodiment of the present disclosure.

As stated shortly above, in the second embodiment, in addition or alternatively to the command signal (boost or buck mode) being output by a system controller 200, in the present embodiment, the buck/boost detection unit 3 is configured to output the mode of operation based on detection within the converter 2 as follows.

Herein, the control circuit 1 comprises a comparator logic module 24.

The comparator logic module 24 is configured to compare voltage values between the bus connection 101 and the output side connection 102. The comparator logic module 24 outputs a signal based on the comparison to the buck/boost detection unit 3.

For instance, in case the comparator logic module 24 senses a voltage, for example 24 V, at the bus connection 101, the comparator logic module 24 outputs a signal (for instance a high signal) indicating "buck" mode, corresponding to for example charging the battery pack (nominal voltage rating 14 V, for example). On the other hand, in case the comparator logic module 24 senses no voltage at the bus connection 101, and senses a voltage at the output side connection 102, the comparator logic module 24 is configured to output a signal (for instance a low signal) indicating "boost" mode, corresponding to for example discharging the battery pack (boosting the 14 V of the battery pack to 24 V).

As indicated in FIG. 3 via the dotted lines, the configuration of the buck/boost detection unit 3 detecting essentially the target mode of operation is in addition or alternatively to the command signal from the system controller 200.

In the foregoing embodiments, at least the PWM control unit 7 and the gate drive signal toggle unit 8 are separate components, especially separate integrated circuits. In other words, preferably, the foregoing described functions and configurations of at least the PWM control unit 7 and the gate drive signal toggle unit 8 are not achieved by a single PWM controller. In the present embodiments, the PWM control unit 7 is preferably single-ended.

Further, preferably, the buck/boost conversion device 100 comprises the foregoing explained components of the bidirectional buck/boost converter 2 and the control circuit 1.

Figure 4:
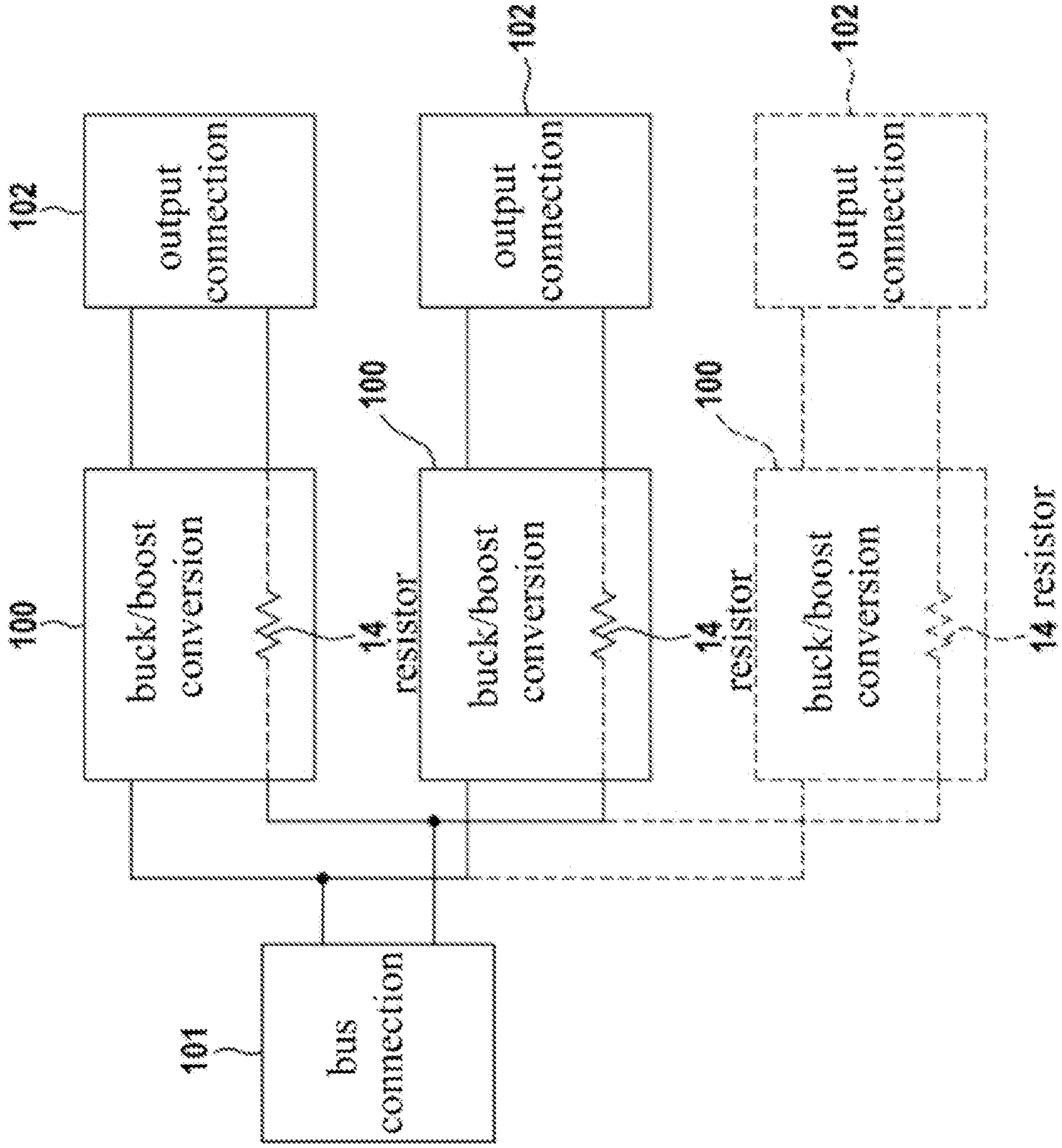
FIG. 4 shows a schematic logic circuit diagram of a connection of a plurality of control circuits and bidirectional buck/boost converters according to the first or second embodiment of the present disclosure.

FIG. 4 shows a schematic logic circuit diagram of a connection of a plurality of control circuits 1 and bidirectional buck/boost converters 2 according to the first or second embodiment of the present disclosure.

Specifically, FIG. 4 shows a plurality of buck/boost conversion devices 100 connected between a common input side 101 (for example, a common input bus) and a respective output 102. Herein, especially in the case of the respective output 102 being a battery or a battery pack, the outputs 102 are not provided in common. In other words, each buck/boost conversion device 100 comprises its own output 102. The buck/boost conversion devices 100 are preferably connected in parallel to the common input side 101.

As shown in FIG. 4, preferably two buck/boost conversion devices 100 are provided. Further preferably, as shown by the dotted lines three or more buck/boost conversion devices 100 may be provided, with the shown connection scheme being extendible to any number of buck/boost conversion devices 100 (for instance, three or more or four or more or five or more, etc.).

Furthermore, as explained above with respect to FIG. 1, each buck/boost conversion device 100 comprises the resistor 14 of the buck/boost DC sensing unit 13.

In general, during boost mode, each boost regulator subunit 6 (compare FIG. 1 or FIG. 3) limits the maximum power output or current input by the respective buck/boost conversion device 100 (at the "output" side 102), for example when discharging the batteries at the output side 102. Thereby, the boost regulator subunits 6 provide power limitation of the output of the buck/boost conversion devices 100. Paralleled modules, as shown in FIG. 4, will share the current output by the buck/boost conversion devices 100 if this maximum power is reached. In the preferable example, in which the voltage regulation carried out by the boost regulator subunit 6 has a falling characteristic at rising load, the output current of the buck/boost conversion devices 100 (at the "input" side 101) to the common input 101 (bus connection) can be shared between the paralleled modules over the complete load range.

In other words, current is balanced between the buck/boost conversion devices 100 via the paralleled module connection shown in FIG. 4. Thereby, preferably, no single battery for example is discharged disproportionately to the other(s).

In addition to the foregoing written explanations, it is explicitly referred to FIGS. 1 to 4, wherein the figures in detail show logic circuit diagrams and configuration examples of the disclosure.

What is claimed is:

1. A control circuit for a bidirectional buck/boost converter connected between an input side and an output side, the bidirectional buck/boost converter having two switches, comprising:

a buck/boost detection unit configured to detect and output a mode of operation of the bidirectional buck/boost converter selected from buck mode and boost mode;

a voltage/current regulator unit configured to receive the mode of operation output from the buck/boost detection unit and configured to output a voltage and/or current regulating signal according to a sensed voltage and/or current signal based on the mode of operation;

a PWM control unit configured to receive the voltage and/or current regulating signal from the voltage/current regulator unit and configured to output a PWM control signal based on the voltage and/or current regulating signal and a switch current value corresponding to one of the two of switches;

a gate drive signal toggle unit configured to receive the PWM control signal and the mode of operation and configured to generate and output gate drive signals for driving switching operations of the two switches of the buck/boost converter from the PWM control signal based on the mode of operation;

a high-side/low-side driver unit configured to receive the gate drive signals output from the gate drive signal toggle unit and configured to amplify the gate drive signals and output the amplified gate drive signals to the two switches;

a plurality of current sensing units, in which each of the plurality of current sensing units senses current of one of the plurality of switches, and a current sense toggle unit configured to receive the switch current value output by each of the current sensing units, to receive the mode of operation, and to output the switch current value sensed by one of the current sensing units based on the mode of operation to the PWM control unit;

wherein the sensed voltage signal received by the voltage/current regulator unit corresponds to the input side or the output side of the bidirectional buck/boost converter based on the mode of operation, and the sensed current signal received by the voltage/current regulator unit is measured at the output side of the bidirectional buck/boost converter based on the mode of operation, and wherein the voltage/current regulator unit comprises a buck regulator subunit and a boost regulator subunit connected in parallel to the PWM control unit, and is configured to output the voltage and/or current regulating signal from one of the buck regulator subunit and the boost regular subunit based on the mode of operation.

2. The control circuit according to claim 1, wherein the PWM control unit is a single-ended PWM controller which provides only one output signal.

3. The control circuit according to claim 1, wherein the gate drive signal toggle unit is configured to output one drive signal for each of the plurality of switches.

4. The control circuit according to claim 3, wherein, based on the mode of operation, the gate drive signal toggle unit is configured to generate a first drive signal by inverting the PWM control signal an odd number of times, and wherein the first drive signal is a synchronous rectification signal.

5. The control circuit according to claim 4, wherein the gate drive signal toggle unit is configured to generate a second drive signal by inverting the PWM control signal an even number of times.

6. The control circuit according to claim 1, wherein the gate drive signal toggle unit comprises an on-time-duration limitation unit configured to limit a time-duration of at least one of the gate drive signals to a maximum threshold value, wherein the on-time-duration limitation unit is configured to set said gate drive signal to low when the maximum threshold value is reached.

7. The control circuit according to claim 1, wherein the gate drive signal toggle unit comprises a dead-time generation unit configured to generate a dead-time between the gate drive signals.

8. The control circuit according to claim 1, further comprising a buck/boost DC sensing unit configured to sense a current output during buck mode and/or current input during boost mode of the buck/boost converter and configured to feed the sensed current back to the voltage/current regulator unit.

9. The control circuit according to claim 8, wherein the voltage/current regulator unit is configured to regulate the voltage and/or current regulating signal based on the fed back sensed current.

10. A buck/boost conversion device, comprising the bidirectional buck/boost converter and the control circuit according to claim 1, wherein the control circuit is configured to control the buck/boost converter so as to buck a voltage input into the buck/boost conversion device or so as to boost a voltage output by the buck/boost conversion device.

11. The buck/boost conversion device according to claim 10, wherein the gate drive signal toggle unit of the control circuit is configured to output one drive signal for each of the plurality of switches, and wherein, based on the mode of operation, the gate drive signal toggle unit is configured to generate a first drive signal by inverting the PWM control signal an odd number of times as a synchronous rectification signal.

12. The buck/boost conversion device according to claim 11, wherein the gate drive signal toggle unit of the control circuit is configured to generate a second drive signal by inverting the PWM control signal an even number of times.

13. The buck/boost conversion device according to claim 12, wherein the buck/boost converter comprises a first switch and a second switch, the first switch is connected in series with an inductor, and wherein in the buck mode:

the second switch is driven with the synchronous rectification signal, and the first switch is driven with the even inverted PWM control signal.

14. The buck/boost conversion device according to claim 13, wherein in the boost mode:

the first switch is driven with the synchronous rectification signal, and the second switch is driven with the even inverted PWM control signal.

15. The buck/boost conversion device according to claim 10, wherein the buck/boost conversion device is connected to a battery pack comprising at least one battery.

16. The buck/boost conversion device according to claim 10, wherein the buck/boost conversion device further comprises a bidirectional blocking circuit.

17. The buck/boost conversion device according to claim 16, wherein the bidirectional blocking circuit is a back-to-back ORing circuit.

18. The buck/boost conversion device according to claim 10, wherein the PWM control unit of the control circuit is a single-ended PWM controller which provides only one output signal.

* * * * *